(12) United States Patent
Johansson

(10) Patent No.: US 7,523,621 B2
(45) Date of Patent: Apr. 28, 2009

(54) SYSTEM FOR HEAT REFINEMENT

(75) Inventor: Ake Johansson, Finspang (SE)

(73) Assignee: ETA Entrans AB, Finspang (SE)

( * ) Notice: Subject to any disclaimer, the term of this patent is extended or adjusted under 35 U.S.C. 154(b) by 99 days.

(21) Appl. No.: 10/570,386

(22) PCT Filed: Sep. 9, 2004

(86) PCT No.: PCT/SE2004/001293

§ 371 (c)(1),
(2), (4) Date: Aug. 3, 2006

(87) PCT Pub. No.: WO2005/024189

PCT Pub. Date: Mar. 17, 2005

(65) Prior Publication Data

US 2007/0017242 A1    Jan. 25, 2007

(30) Foreign Application Priority Data

Sep. 10, 2003  (SE) .................................. 0302419

(51) Int. Cl.
F25B 27/00 (2006.01)
(52) U.S. Cl. ....................................... 62/238.6; 60/653
(58) Field of Classification Search ................ 62/238.6, 62/467, 498; 60/653
See application file for complete search history.

(56) References Cited

U.S. PATENT DOCUMENTS

| | | | | |
|---|---|---|---|---|
| 4,086,072 A | * | 4/1978 | Shaw | ........................ 62/160 |
| 4,471,622 A | | 9/1984 | Kuwahara | |
| 4,873,839 A | * | 10/1989 | Dessanti et al. | ............ 62/238.6 |
| 4,876,856 A | * | 10/1989 | Iishiki et al. | .................. 60/671 |
| 4,896,515 A | | 1/1990 | Endou | |
| 5,678,420 A | * | 10/1997 | Fukushima et al. | ........ 62/238.6 |
| 6,460,360 B2 | * | 10/2002 | Hsieh | ........................ 62/238.1 |
| 6,581,384 B1 | * | 6/2003 | Benson | ........................ 60/653 |

FOREIGN PATENT DOCUMENTS

| | | |
|---|---|---|
| EP | 1 174 590 | 1/2002 |
| GB | 660771 | 11/1951 |
| GB | 2 239 489 | 7/1991 |

OTHER PUBLICATIONS

Atlas Copco publication on turboexpanders (date unknown).
ET Turboexpanders, Jan. 24, 2003.

* cited by examiner

Primary Examiner—William E Tapolcai
(74) Attorney, Agent, or Firm—Young & Thompson

(57) ABSTRACT

The present invention relates to a system for heat refinement by utilizing waste heat in a conduct (6) comprising a first cycle (2), an evaporator (4) In which the circulating working fluid is evaporated to gas, a compressor (8) that compress the gas, a condenser (10) that condenses the gas to a condensate and releases heat to a passing heat carrier in the condenser, and an expansion valve (14) that expands the condensate and bring back the working fluid to the evaporator (4). The system further comprises a second cycle (16; 16*a-d*) is attached to the first cycle (2), a turbine (18), which supplies gas from the evaporator (4), whereby an expansion occurs, whereafter condensate is brought back to the evaporator (4).

19 Claims, 7 Drawing Sheets

SYSTEM FOR HEAT REFINEMENT

TECHNICAL AREA

The present invention relates to a system for heat refinement by utilization of waste heat or other sources of heat, alternatively district cold.

BACKGROUND

Large amounts of waste heat of varying temperature are produced in Sweden and in the rest of the world. This heat is often disposed of to the surroundings, for example to lakes, watercourses, etc. Vast economical and environmental advantages can be reached if this waste heat can be refined. Around the world there is industries that is in need of large amounts of heat at high temperature and that produces large amounts of waste heat at lower temperatures. In Sweden there is example of utilization of waste heat for heating purposes, for example to the district heating net-work, from processes that requires a great deal of energy. Depending on the waste heat temperature, there can be some limitations in the utilization, such as temperature demand on the district heating network, distance between waste heat and the district heating network, etc. However, sometimes the waste heat surplus cannot be used at all for heating purposes, depending on the time of the year or that there is no addressee of the heat.

EP-A2-1174590 discloses a method and an apparatus for production of electricity, where a liquid such as water is evaporated in a first system and transfer heat through an evaporator to a cooling agent that circulates in a second system, separated from the first system, where the cooling agent expands and produces electricity. The evaporation occurs at a relatively high temperature, about 200° C.

DESCRIPTION OF THE INVENTION

An object with the present invention is to achieve a system for heat refinement through utilization of waste heat or other heat source, alternatively district cold, that at least eliminates those drawbacks that are associated with apparatuses according to the state of the art. Yet an object is to achieve a system for production of cold and/or heat and/or mechanical energy and/or electrical energy, and that can work in a large range of temperature and particularly with a heat source with relatively low temperature.

This object is achieved with a system for heat refinement through utilization of waste heat or other heat source, alternatively district cold, according to the present invention such as defined in claim 1. The system comprises a first cycle for circulation of a working fluid that at demand can produce cold and/or heat, an evaporator in which the circulating working fluid is evaporated to gas by taking up heat in the evaporator from passing the waste heat or district cold that is transported in a conduit, a compressor that compress the gas, a condenser that condenses the gas to a condensate and releases heat to a passing heat carrier in the condenser, and an expansion valve that expands the condensate and bring back the working fluid to the evaporator. Furthermore, the system comprises a second cycle, that is connected to the first cycle, for circulation of the working fluid that on demand can produce mechanical energy and/or electrical energy. The second cycle is attached to the first cycle. Further, the system comprises an expansion apparatus, such as a turbine, which turbine is supplied with gas from the evaporator, whereby an expansion occurs. The working fluid is brought back to the evaporator.

An advantage with this solution is that heat, in the state of waste heat or other heat source, alternatively district cold, can be used such that evaporation of the working fluid can occur at low as well as high temperature, and consequently the system can be alternated between production of cold and/or heat refinement and/or mechanical energy and/or electrical production. When the waste heat surplus not can be used at all for heating purposes, depending on the time of the year or that there is no addressee of the heat, the system can be controlled to solely produce electric power. Yet an advantage is that existing heat pumps can be reconstructed to the system according to the present invention. There is a large flexibility in the solution of the system according to the present invention that means that the working fluid can be selected according to the temperature of the heat source. If the waste heat is temperature refined, the demand on the district heat temperature can be meet simultaneously as there is less demand on dimensions on conduits and lower flow rates.

According to a preferred embodiment, the system according to the present invention can comprise one or more evaporators. The system can work as both as a single or multistage heat pump and/or a condensation power plant with expansion in one or more turbine stages with or without intermediate superheating. Multistage heat pumps are utilized when there is demand of high pressure work in order to reach desired temperature on the heat carrier. In a multistage heat pump, expansion occurs of the condensate after the condenser in two or more stages. In each expansion stage a certain amount of gas is formed that is brought to correct pressure stage in a multistage compressor.

For low temperature sources, below about 70° C., some kind of working fluid is used, such as a cooling agent with a boiling point at low temperature, for example HFC R134a or some natural cooling agent such as ammonium or the similar. The advantage by using a cooling agent is that the volume of the cooling agent steam at low temperature is considerable less than water steam, at the same temperature. Besides, the pressure is higher than atmospheric pressure which among other things prevents leakage of air in the plant. At temperatures over 80-85° C. use is suitably made of water as working fluid, whereby several hundred degrees can be achieved.

By a system for heat refinement is meant production of cold and/or heat and/or mechanical energy and/or electrical energy by use of waste heat or other heat source.

By heat carrier is meant for example hot or circulation water conduit, waste heat conduit or the similar.

Possible waste heat sources are for example various industries, power plants, high-temperature water boilers, solar heat systems, geoheat plants, incineration plants, all kinds of motor vehicles, ships etc. The waste heat loss in a vehicle for example, as exhaust gases and cooling water, can be utilized and converted to electrical power or mechanical work, which would mean decreased fuel consumption. One example of another heat source apart from waste heat source is sea water.

Additional advantages and features according to embodiments of the invention are evident from the claims, and also in the following from the description of embodiments.

DESCRIPTION OF DRAWINGS

The invention will now be described more in detail in embodiments, by reference to attached drawings, without limiting the interpretation of the invention thereto, where.

DETAILED DESCRIPTION OF EMBODIMENTS

Figure 1:
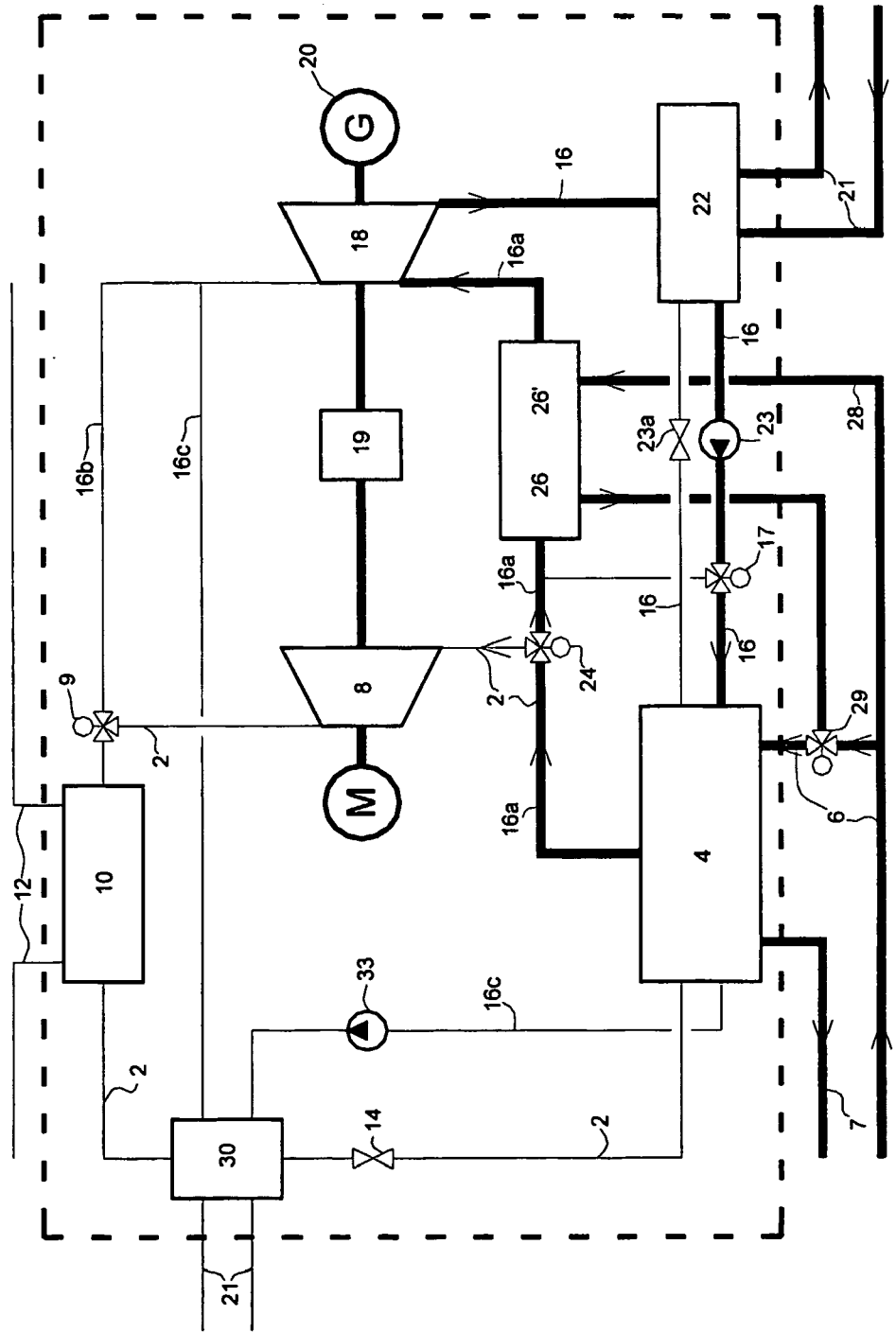
FIG. 1 shows schematically a system according to the present invention connected principally for electrical production.

A system, according to embodiments of the present invention, for production of cold and/or heat and/or mechanical energy and/or electrical energy by utilization of waste heat or other heat source, alternatively district cold, is shown in FIG. 1-6. The system comprises a first cycle 2 for circulation of a working fluid. An evaporator 4 is arranged to the first cycle 2, in which the circulating working fluid is evaporated to gas by taking up heat in the evaporator from a passing flow of waste heat or other heat source, such as for example sea water, alternatively district cold, that is conveyed in a conduit 6. A compressor 8 is arranged to the first cycle 2 in the direction of the flow (see arrows on the cycle conduit 2) after the evaporator 4. The compressor 8 compresses the gas from the evaporator. A condenser 10 is arranged to the first cycle 2, in the direction of the flow after the compressor 8, which condenser 10 condensates the gas to a condensate and releases heat to a passing heat carrier in the condenser, for example hot or circulating water conduit 12, waste heat conduit or the similar. An expansion valve 14 is arranged to the first cycle 2, in the direction of the flow after the condenser 10, which expansion valve 14 expands the condensate and brings back the working fluid to the evaporator 4. The system further comprises a second cycle 16, comprising three partial cycles 16a-16c, according to the embodiment in FIG. 1-5 and four partial cycles 16a-16d according to the embodiment in FIG. 6, that is in connection with the first cycle 2, for circulation of the working fluid, which second cycle is connected to the first cycle 2. A turbine 18, or similar expansion apparatus, is attached to the second cycle 16, which turbine 18, arranged in the direction of the flow (see arrow on the cycle conduits 16a-d) after the evaporator 4, is supplied with gas from the evaporator 4. The gas is allowed to expand in the turbine 18 and a generator 20 is connected to the turbine for production of electricity. Produced mechanical work of the turbine can also operate the compressor 8 via a switch 19. A second condenser 22 is connected to the second cycle, in the direction of the flow after the turbine, which second condenser 22 condensates the gas from the turbine 18, whereafter the condensate from the condenser 22 is brought back, suitably via a second expansion valve 23a or a pump 23, to the evaporator 4. In the second condenser 22 is suitably connected a conduit 21 for conducting away heat to a passing flow of heat carrier of preferably low temperature in the conduit 21. The first cycle 2 is intended to produce cold and/or heat on demand and the second cycle 16 is intended for production of mechanical energy and/or electrical energy on demand.

Preferably, the system further comprises a first control valve 24, attached to the first cycle 2 and in connection to the first partial cycle 16a of the second cycle 16. In the embodiments according to FIG. 1-6, this control valve is arranged to the first cycle 2 in the direction of the flow after the evaporator 4 and before the compressor 8. The first partial cycle 16a is arranged to the first control valve 24. The control valve 24 is arranged to control the flow of gas, that is evaporated working fluid, in the first cycle 2 and the first partial cycle 16a, respectively, whereby simultaneous cold, heat and mechanical energy and/or energy production can be obtained, or alternatively only cold and heat or cold and mechanical energy and/or electrical production, by means of control of the desired flow to the cycles 2, 16a, 16 respectively, by the first control valve 24.

Furthermore, according to the embodiment in FIG. 1-6 is a superheater 26 connected to the first partial cycle 16a, to which gas from the first cycle 2 is transmitted, which superheater give off overheated gas to the subsequent turbine 18. The superheater 26 is arranged in the direction of the flow before the turbine 18. Preferably additional energy can be added to the working fluid in the superheater 26 by passage of waste heat in a conduit 28 in the superheater. A second control valve 29 can control the desired flow of waste heat to the evaporator 4 and the superheater 26, respectively.

The waste heat that is brought to the evaporator and preferably also to the superheater 26, may suitably have a temperature from about 15° C. and above. An upper temperature of the waste heat is preferably 100° C. or lower, and most preferred 50° C. or lower. In the most general embodiment, the system according to the present invention is still not limited to the above mentioned range of temperature, but can work at higher as well as lower temperatures than those mentioned.

Preferably the system comprises further a first switch valve 17, connected to the second cycle 16 and in connection to the partial cycle 16a. In the embodiments according to FIG. 1-6 is this first switch valve arranged to the second cycle 16 in the direction of the flow after condensate pump 23. The first switch valve is arranged to sectionalise cycle 16 from cycle 2 together with first control valve 24 such that evaporation of the working fluid can occur at various temperatures. Evaporation occurs in evaporator 4 in cycle 2 and in superheater 26 in cycle 16. Superheater 26 may work as superheater as well as evaporator 26'.

Preferably, the system comprises further a third control valve 9, arranged to the first cycle 2 and in connection to a second partial cycle 16b of the second cycle 16. In the embodiments according to FIG. 1-6, this third control valve is arranged to the first cycle 2 in the direction of the flow after the compressor 8 and before the condenser 10. The second partial cycle 16b is connected to third control valve 9. The third control valve 9 is arranged to control the flow of compressed gas in the first cycle 2 and the second partial cycle 16b, respectively. The flow of compressed gas from the third control valve 9 to the second partial cycle 16b is brought further to turbine 18, whereby simultaneous production of cold, heat and mechanical energy and/or electrical energy can be obtained, by means of the third control valve 9 that controls the desired flow to the cycles 2, 16b, 16 respectively.

Preferably the system further comprises a heat exchanger 30, in the direction of the flow arranged between the condenser 10 and the expansion valve 14, connected to the first cycle 2. Furthermore, a condensate supply conduit of a third partial cycle 16c is connected from the evaporator to the heat exchanger 30. Condensate from the evaporator 4 is pumped by the pump 33 to the heat exchanger 30. Gas that is formed through evaporation of the working fluid in the heat exchanger 30 is transferred through the third partial cycle 16c that is a part of the second cycle 16, that in this embodiment is connected to the heat exchanger 30, and further to the turbine 18, whereby a part of compressor work can be recovered which otherwise should be lost in the expansion between the condenser 10 and evaporator 4.

Figure 6:
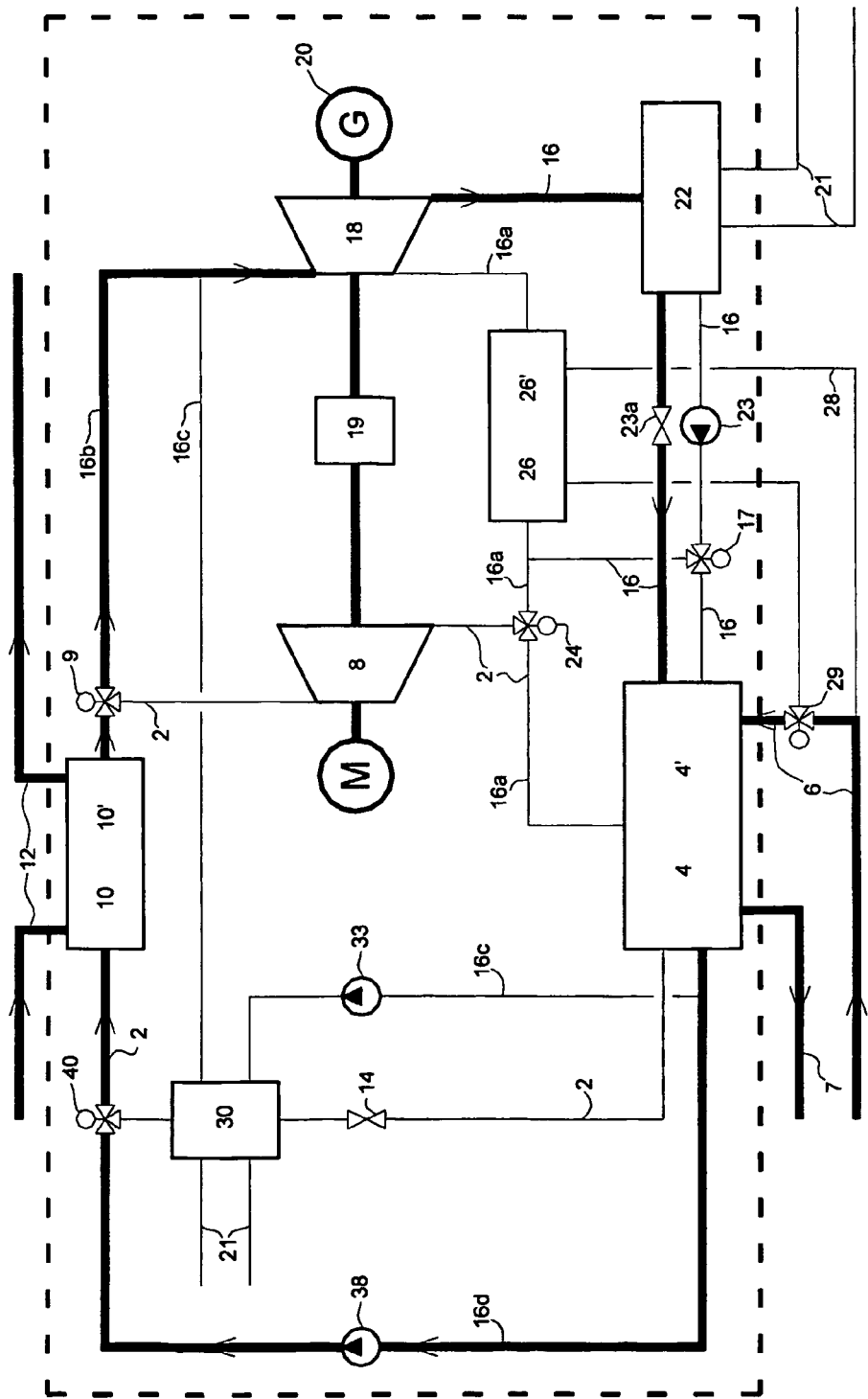
FIG. 6 shows schematically an alternative embodiment of the system according to FIG. 1-5 connected for electrical production.

Preferably the system further comprises a condensate pump 38, in a fourth partial cycle 16d connected to first cycle 2, in embodiment according to FIG. 6. Condensate pump 38 is arranged to pump condensate from evaporator 4, that in this embodiment according to FIG. 6 works as a condenser 4', to condenser 10, that in this embodiment according to FIG. 6 works as an evaporator 10'. Further is a second switch valve 40 connected between the condensate pump 38 in the fourth partial valve 16d and evaporator 10' in the first cycle 2. The second switch valve 40 is arranged to put in the fourth partial cycle 16d at electrical production in the embodiment according to FIG. 6.

With reference to FIG. 1-6, various modes of operation A-F will now described:

A) FIG. 1 shows the system connected for electrical production in principal (lines that are printed in extra bold type means that they are connected in the present mode of operation). The drawing shows a one-stage process but may of course be a multi-stage process. The cycle process starts in the evaporator 4. The circulating medium is totally evaporated by absorbing heat from heat source 6, with a temperature of preferably 50° C. or higher, which thereby is cooled 7, i.e. production of cold occurs. Steam is supplied with more energy in the preferred superheater 26. Heat has been added in the evaporator and the superheater. The overheated steam expands in the turbine 18. Subsequently the steam condensate in the condenser 22 accompanying turbine 18. The heat is transmitted to a cooling depression, having a temperature of preferably 15° C. or lower. The condensated medium is pumped by pump 23 back to the evaporator and the cycle process is closed.

Figure 2:
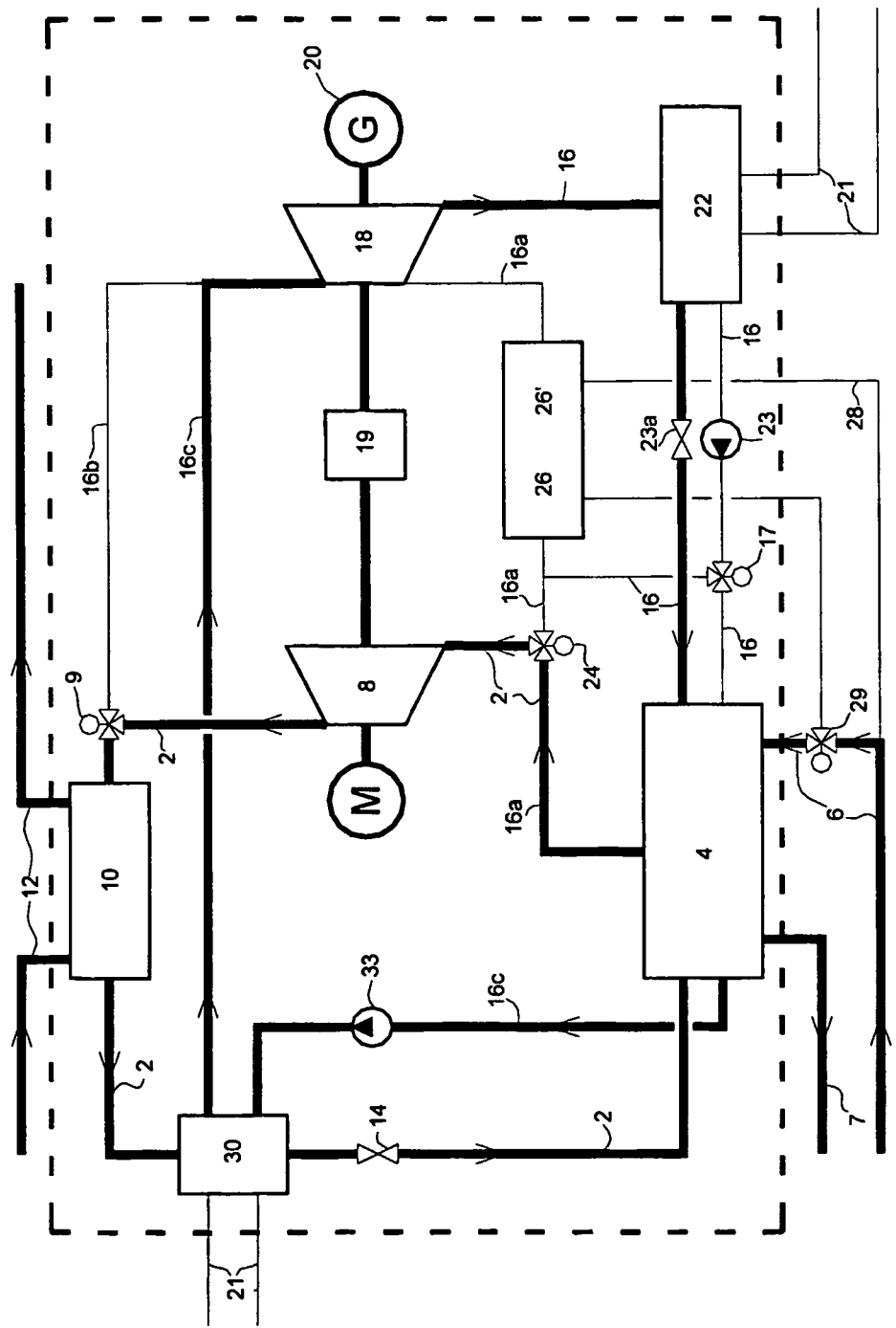
FIG. 2 shows schematically the system according to FIG. 1 connected in principal for heat production.

B) FIG. 2 shows the system connected for heat refinement in principle, but also cold production and recovery of compressor work (lines that are printed in extra bold type means that they are connected in the present mode of operation). The connection shows a one-stage process but may of course be a multi-stage process. The cycle process starts in the evaporator 4. The circulating medium is completely evaporated. Heat is supplied either from the waste heat source or from another heat source, for example sea water, with a temperature of preferably 5° C. or higher. If waste heat is used as heat source, the waste heat system is only supplied with the operation energy that is needed to the compressor 8 in comparison to if an external heat source is used, for example sea water when both energy absorbed in evaporator and operating energy to the compressor is supplied to the waste heat system. This is a major principal difference if one only is out for a temperature refinement. After the evaporator, the gas is compressed in the compressor 8. Subsequently the gas is condensated in the condenser 10 accompanying the compressor. The heat is transmitted to a partial flow 12 from the waste heat source, which thereby is heated to about 60° C. or higher. The condensate is supercooled in heat exchanger 30 by heat exchanging against third partial cycle 16c comprising of condensate from evaporator 4. The condensate in the third partial cycle 16c is preheated and evaporated in heat exchanger 30 and is further lead to turbine 18 whereby expansion occur. The working fluid is further brought to evaporator 4. Cold production in evaporator 4 can be increased if the gas is condensated in condenser 22 after the turbine 18. The supercooled condensate from heat exchanger 30 expands in expansion valve 14 to the evaporator 4. Thereby the cycle process is closed.

Figure 3:
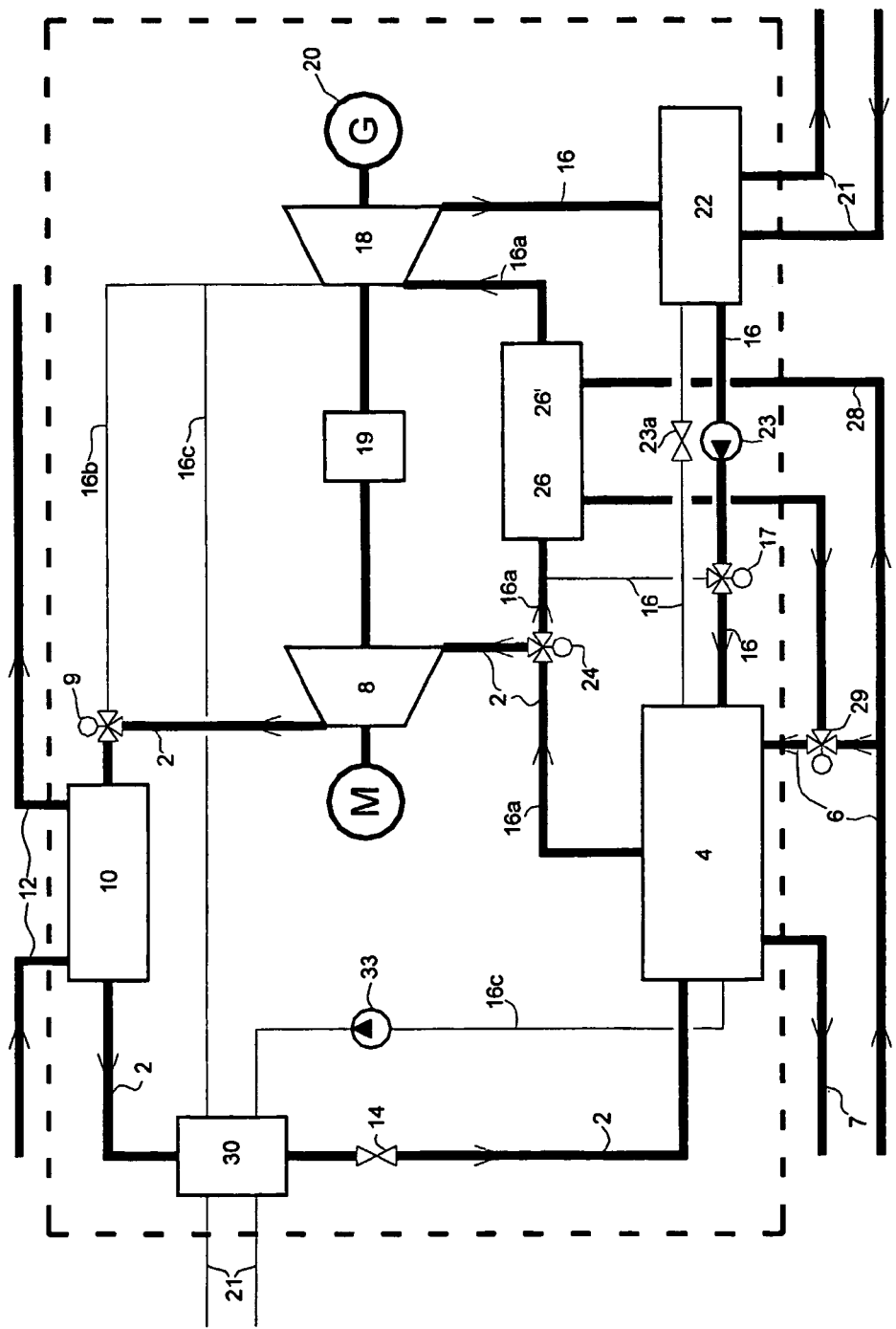
FIG. 3 shows schematically the system according to FIG. 1-2 connected for simultaneous cold-, heat- or electrical production.

C) FIG. 3 shows the system connected for simultaneous cold, heat and electrical production (lines that are printed in extra bold type means that they are connected in the present mode of operation). The cycle processes works in accordance with the explanations to FIGS. 1 and 2. The evaporator 4 supplies in this operation mode both the turbine 18 and the compressor 8 with gas. A first control valve 24 controls desired flow to compressor 8 and to turbine 18, respectively. This connection means a great freedom in operation strategy. For example may priority be given to electricity in the daytime and heat during the night. At large availability of waste heat the turbine 18 may operate both the compressor 8 and the generator 20.

Figure 4:
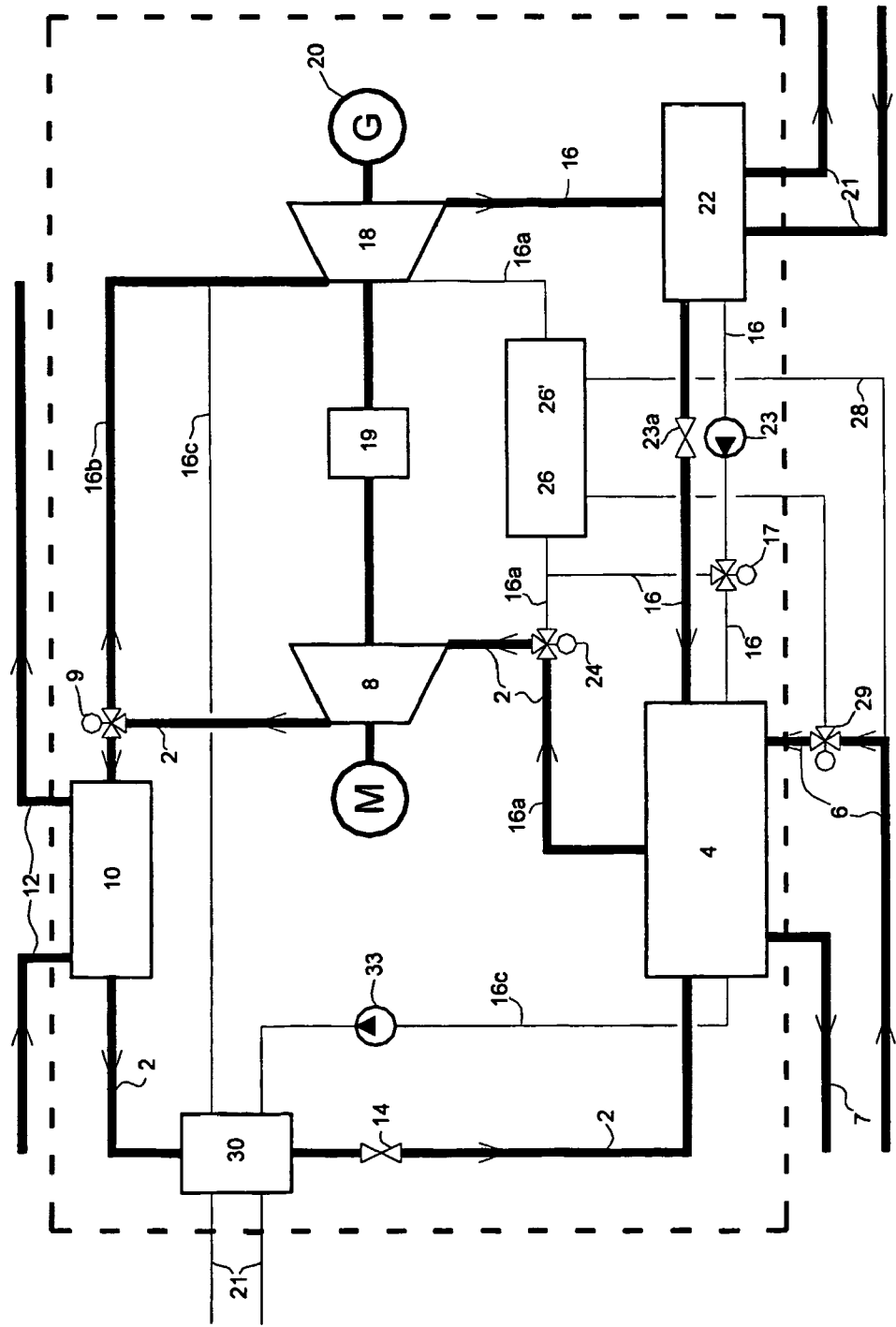
FIG. 4 shows schematically the system according to FIG. 1-3 connected for in principal cold production.

D) FIG. 4 shows the system connected for cold production in principal (lines that are printed in extra bold type means that they are connected in the present mode of operation). The cycle processes works in accordance with the explanations to FIGS. 1, 2 and 3. The amount of evaporated gas from evaporator 4, that is not needed after compression in compressor 8 for meeting existing heat demand, is brought to turbine 18 via the second partial cycle 16b for expansion, which means that compressor work is recovered. In order to increase cold production in evaporator 4 the gas is condensated after the turbine 18 in condenser 22 against heat carrier 21 with low temperature, suitably about 5-25° C.

Figure 5:
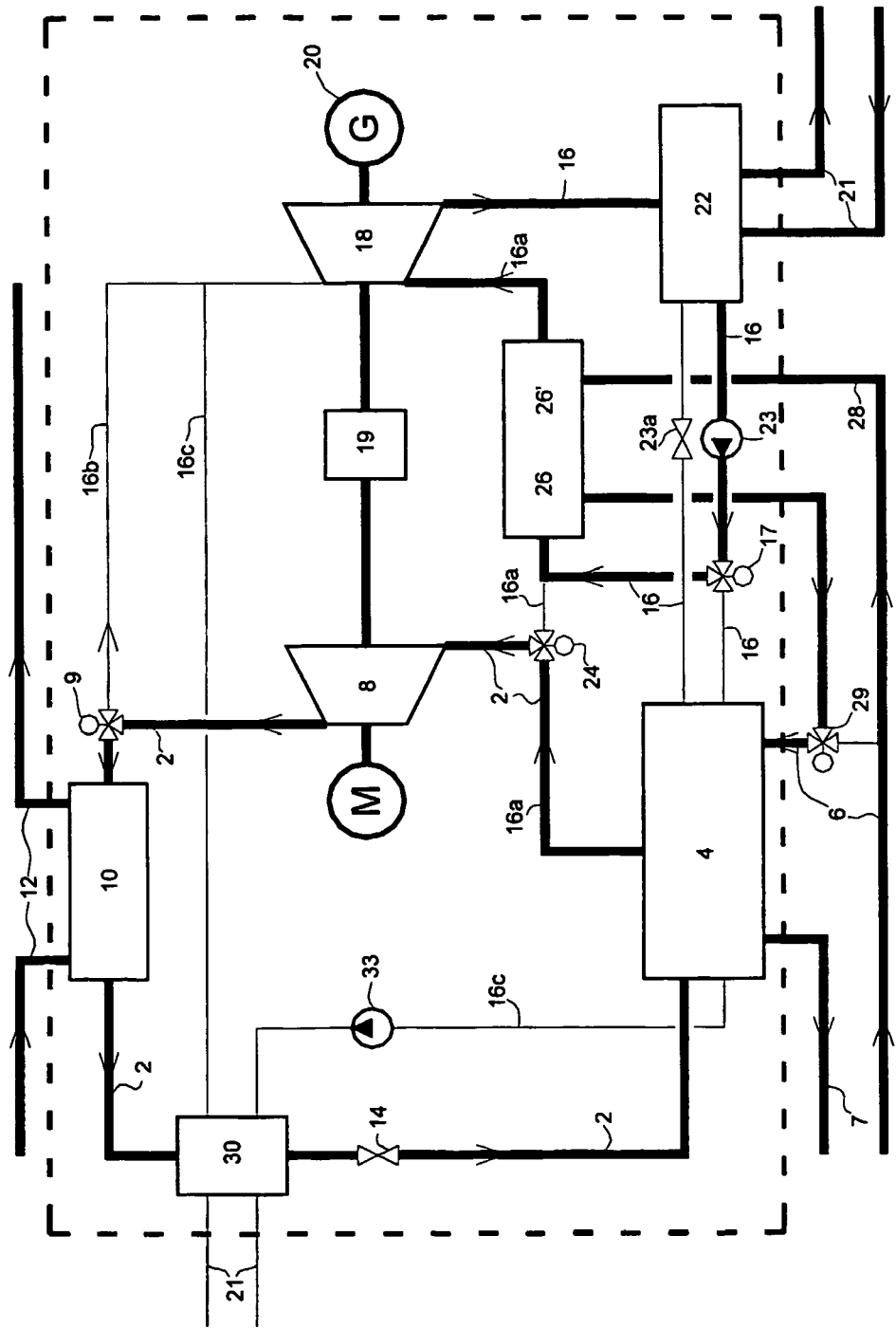
FIG. 5 shows schematically the system according to FIG. 1-4 connected for simultaneous cold-, heat- or electrical production, where the first and the second cycle, respectively, are separated from each other, evaporation in the respective cycle occurs at different temperatures in separate evaporators.

E) FIG. 5 shows the system connected for simultaneous cold, heat and electrical production (lines that are printed in extra bold type means that they are connected in the present mode of operation). The cycle processes works in accordance with the explanations to FIG. 1-4. First switch valve 17 and first control valve 24 sectionalise first cycle 2 and second cycle 16. Superheater 26 works in this operation mode as evaporator 26'. Evaporation may hence occur at different temperatures in the cycles 2, 16. The waste heat transmits in this case heat first to evaporator 26' whereby the temperature of the waste heat decreases, then heat is transmitted in evaporator 4 but at considerable lower temperature. In this way the heat in the waste heat source can be utilized in an effective way. There is also a possibility to use two different heat sources at different temperatures. For example, a waste heat source of about 50° C. can be used to evaporate the working fluid in the evaporator 26', in the second cycle 16, that is expanding in the turbine 18 and that in turn operates the compressor 8 in the first cycle 2. The evaporation in the second cycle 16 then occurs at a relatively high temperature. Further there is a need of cooling, for example in a district cold network. In order to reach the temperature demands of the district cold network of about 5-10° C., the evaporation in the first cycle 2, in evaporator 4, have to occur at a relatively low temperature preferably about 0° C.

F) FIG. 6 shows an alternative embodiment of the system according to previous FIG. 1-5, connected for electrical production (lines that are printed in extra bold type means that they are connected in the present mode of operation). This alternative design of the system differs from the above described operations of modes A)-E) by that it further comprises an additional fourth partial cycle 16d, that is connected via second switch valve 40, that is connected between the evaporator 4 and the condenser 10, and that is put in when the system shall be utilized only for electrical production. The cycle process starts in the condenser 10 that in this case works as an evaporator 10', the working fluid is evaporated in the evaporator 10' (condenser 10) at high pressure and high temperature by supplying heat to the working fluid from a heat source 12 with high temperature, preferably 50° C. or higher, e.g. district heat. The working fluid is then expanded in an expansion apparatus 18 whereby the pressure and the temperature of the working fluid fall. Energy is removed from the working fluid in the form of mechanical energy in, expansion apparatus. The working fluid is then condensated at low pressure and low temperature in evaporator 4 which by that means is utilized as condenser 4'. Heat is transmitted from working fluid, for example to sea water, preferably at a temperature of 15° C. or lower. The working fluid is then pumped, via the fourth partial cycle 16d with condensate pump 38, to evaporator 10' whereby the cycle process is closed.

Figure 7:
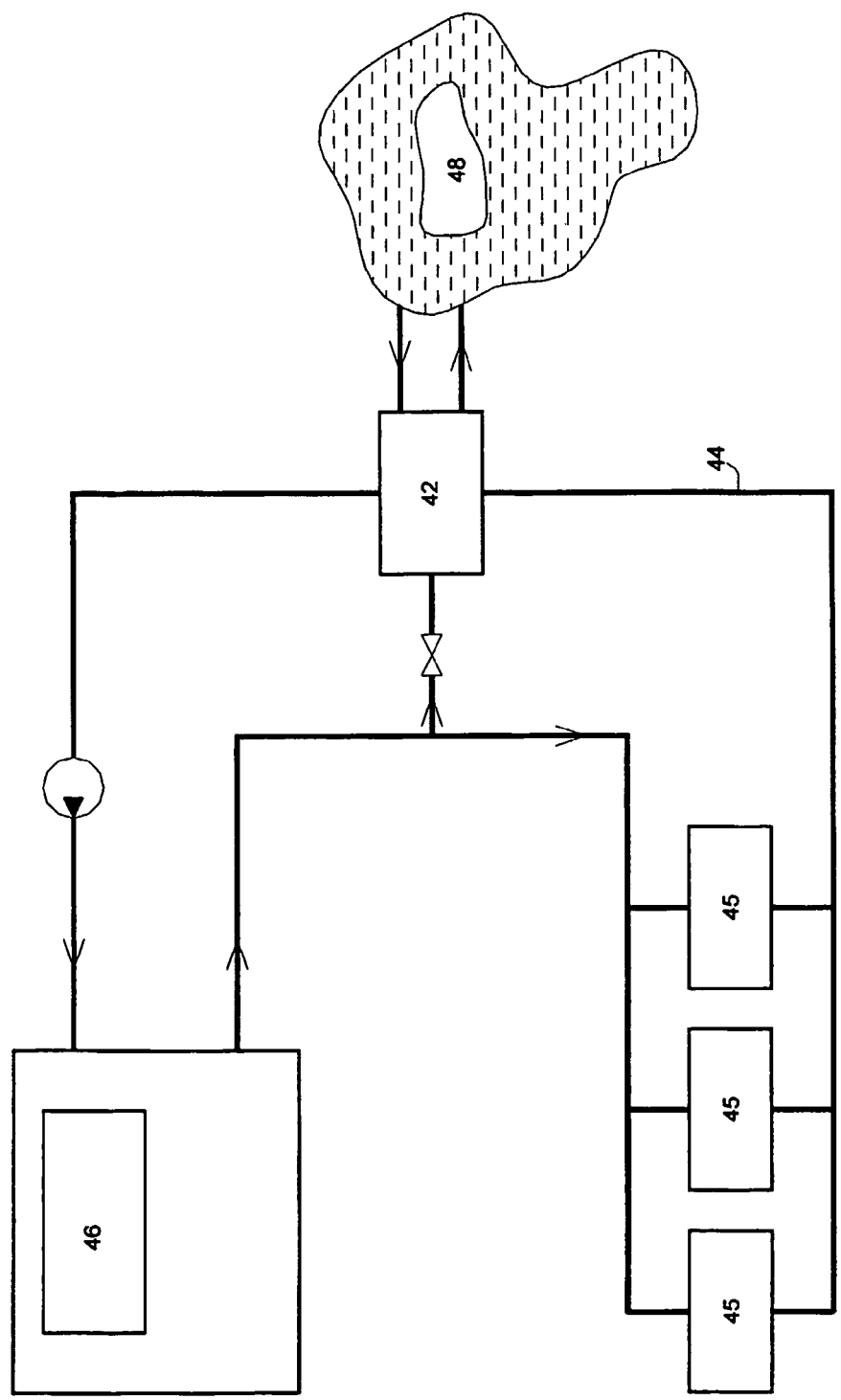
FIG. 7 shows schematically how a combination of the systems according to FIG. 2 and FIG. 6 are connected in a district heat network that is in connection with an incineration plant.

FIG. 7 shows schematically how a combination 42 of the systems according to FIG. 2 and FIG. 6 are connected in a district heat network 44, with a number of clients 45, that is couple together with an incineration plant 46. When there is a need for heat, the system 42 is utilized to produce heat according to FIG. 2. Then, when a heat surplus arises from the incineration plant 46, the heat is utilized to produce electricity in system 42 according to FIG. 6. The system is connected to a waste water or sea water source 48 whereto heat can be given off according to FIG. 6 and where heat can be obtained according to FIG. 2.

The invention claimed is:

1. A system for heat refinement through utilization of waste heat or other heat sources, or district cooling, for alternation between production of cold and/or heat refinement and/or mechanical energy and/or electrical production, which system comprises:
    a first cycle (2) for circulation of a working fluid, an evaporator (4) in which the circulating working fluid is evaporated to gas by taking up heat in the evaporator from passing waste heat or the district cooling that is transported in a conduit (6) which then is cooled (7), a compressor (8) that compress the gas, a condenser (10) that condenses the gas to a condensate and releases heat to a passing heat carrier in the condenser, and an expansion valve (14) that expands the condensate and bring back the working fluid to the evaporator (4);
    a second cycle (16; 16a-d), that is in connection with the first cycle (2), for circulation of the working fluid, which second cycle (16; 16a-d) is attached to the first cycle (2), an expansion apparatus, such as a turbine (18), attached to the second cycle (16; 16a-d) which turbine (18) supplies gas from the evaporator (4), whereby an expansion occurs, whereafter the working fluid is lead to evaporator (4), alternatively via a second condenser (22) connected to the second cycle (16) that condensates the gas from the turbine (18), whereafter condensate is brought back to the evaporator (4); and
    a fourth partial cycle (16d) of the second cycle (16) is connected, via a second switch valve (40), at electrical production where condenser (10) is utilized as an evaporator (10') and evaporator (4) is utilized as condenser (4'), further is a condensate pump (38) arranged in the fourth partial cycle (16d) between the condenser (4') and the second switch valve (40), to pump the condensate from the condenser (4') to the evaporator (10').

2. The system according to claim 1, further comprising:
    a first control valve (24) connected to first cycle (2) and in connection with the first partial cycle (16a) of the second cycle (16), arranged to control the flow of evaporated gas in the first cycle and the second cycle, respectively, whereby simultaneous cold, heat and electrical production can occur, or alternatively only cold and heat or cold and electrical production can occur, by means of control of the desired flow to the cycles (2, 16a, 16) respectively, by the first control valve (24).

3. The system according to claim 2, wherein the first control valve (24) is arranged after the evaporator (4) and before the compressor (8).

4. The system according to claim 3, further comprising:
    a superheater (26) connected to the first partial cycle (16a), to which gas from the first cycle (2) is transmitted, which superheater (26) give off overheated gas to the subsequent turbine (18).

5. The system according to claim 4, wherein additional energy can be added to the working fluid in the superheater (26) by passage of waste heat or other heat source (28) in the superheater (26).

6. The system according to claim 1, wherein a produced mechanical work of the turbine (18) operates the compressor (8) via a switch (19).

7. The system according to claim 1, wherein a produced mechanical work of the turbine (18) preferably operates a generator (20) for production of electricity.

8. The system according to claim 1, wherein the waste heat has a large variation in temperature, suitably from 15 C. and above.

9. The system according to claim 1, for recovering compressor work and increased cold production, further comprsing:
    a heat exchanger (30) arranged between the condenser (10) and the expansion valve (14), connected to the first cycle (2), a condensate supply conduit of a third partial cycle (16c) is further connected from the evaporator to the heat exchanger (30), such that gas that is formed through evaporation of the working fluid in the heat exchanger (30) is transferred through the third partial cycle (16c) and further to the turbine (18), whereby simultaneous cold, heat and electrical production can occur, whereby a part of compressor work can be recovered.

10. The system according to claim 1 for production of mechanical work and/or electrical energy, wherein the system further comprises a third control valve (9), arranged to the first cycle (2) and in connection to a second partial cycle (16b) of the second cycle (16), which third control valve is arranged to the first cycle (2) in the direction of the flow after the compressor (8) and before the first condenser (10), where the second partial cycle (16b) is connected to third control valve (9), whereby the control valve (9) is arranged to control the flow of compressed gas in the first cycle (2) and the second partial cycle (16b), respectively, and where the flow of compressed gas from the third control valve (9) to the second partial cycle (16b) is brought further to turbine (18), such that simultaneous production of cold, heat and mechanical energy and/or electrical energy can be obtained, by means of the third control valve (9) that controls the desired flow to the cycles (2,16b, 16) respectively.

11. The system according to claim 1 for increased cold production, further comprising:
    a heat carrier of a low temperature in a conduit (21) connected to the second condenser (22) removes heat and thereby the gas is condensated to condensate in condenser (22) before further transfer to evaporator (4).

12. The system according to claim 2, further comprising:
    an evaporator(26') connected to the second cycle (16), the system comprises further a first switch valve (17), arranged to the second cycle (16) in the direction of the flow after condensate pump (23), arranged between the second condenser (22) and the evaporator (26'), which condensate pump (23) pumps the condensated medium back to the evaporator (26'), said first switch valve is arranged to sectionalise cycle (16) from first cycle (2) together with first control valve (24).

13. The system according to claim 12, wherein evaporation in the first cycle (2) and the second cycle (16), respectively, occurs at different temperatures, e. g. with a waste heat source of a temperature of about 50 C. for evaporation in the second cycle (16) and with district cooling, free cold and/or waste water with a relatively low temperature for evaporation in the first cycle (2) in order to meet the temperature requirements of the district cooling network of about 5-10 C.

14. The system according to claim 12, wherein evaporation in the first cycle (2) and the second cycle (16), respectively, occurs with different heat sources, such as e. g. with a waste heat source in the second cycle (16) and with district cooling, free cold and/or waste water in the first cycle (2).

15. The system according to claim 12, wherein the first cycle (2) and the second cycle (16), respectively, works independently of each other, through control of desired flows to the cycles (2,16) respectively, by means of the first switch valve (17), first control valve (24), and/or a third control valve (29).

16. The system according to claim 2, wherein a produced mechanical work of the turbine (18) operates the compressor (8) preferably via a switch (19).

17. The system according to claim 3, wherein a produced mechanical work of the turbine (18) operates the compressor (8) preferably via a switch (19).

18. The system according to claim 4, wherein a produced mechanical work of the turbine (18) operates the compressor (8) preferably via a switch (19).

19. The system according to claim 5, wherein a produced mechanical work of the turbine (18) operates the compressor (8) preferably via a switch (19).

* * * * *